US012095656B2

(12) United States Patent
Dikshit et al.

(10) Patent No.: US 12,095,656 B2
(45) Date of Patent: Sep. 17, 2024

(54) FAILURE DETECTION AND MITIGATION IN AN MC-LAG ENVIRONMENT

(71) Applicant: HEWLETT PACKARD ENTERPRISE DEVELOPMENT LP, Houston, TX (US)

(72) Inventors: Saumya Dikshit, Bangalore (IN); Vinayak Joshi, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 194 days.

(21) Appl. No.: 17/391,836

(22) Filed: Aug. 2, 2021

(65) Prior Publication Data
US 2022/0400075 A1    Dec. 15, 2022

(51) Int. Cl.
*H04L 45/28* (2022.01)
*H04L 12/46* (2006.01)
*H04L 41/0604* (2022.01)
*H04L 41/0816* (2022.01)
*H04L 45/24* (2022.01)
(Continued)

(52) U.S. Cl.
CPC .......... *H04L 45/28* (2013.01); *H04L 12/4633* (2013.01); *H04L 12/4641* (2013.01); *H04L 41/0627* (2013.01); *H04L 41/0816* (2013.01); *H04L 45/245* (2013.01); *H04L 45/74* (2013.01); *H04L 2101/622* (2022.05)

(58) Field of Classification Search
CPC . H04L 45/74; H04L 12/4633; H04L 41/0627; H04L 12/4641; H04L 41/0816; H04L 2101/622; H04L 45/28; H04L 45/245
See application file for complete search history.

(56) References Cited

U.S. PATENT DOCUMENTS 9,264,347 B2    2/2016    Anumala et al.
9,699,030 B1    7/2017    Kumar
(Continued)

OTHER PUBLICATIONS

Aruba, "High Availability From Campus to Data Center", Aruba Virtual Switching Extension (VSX), Technology Brief, 2021, 4 pages.
(Continued)

*Primary Examiner* — Nam T Tran
(74) *Attorney, Agent, or Firm* — Hewlett Packard Enterprise Patent Department (57) ABSTRACT

In an example, a failure event is detected in a network, where the failure event is indicative of a network outage in a network device or a peer network device of an MC-LAG. The network device and the peer network device may be configured as a first VTEP in an overlay network. It may be determined that reprovisioning of virtual tunnels in the network device is incomplete. State parameters between the network device and the peer network device is synchronized. The set of virtual tunnels in the network device is provisioned based on the state parameters. After completion of provisioning of the virtual tunnels, an IP address of the first VTEP is published to underlay network devices connecting the first VTEP to a second VTEP over an underlay network. Subsequently, communication links between the MC-LAG and a host device is enabled.

20 Claims, 6 Drawing Sheets

(51) Int. Cl.
H04L 45/74 (2022.01)
H04L 101/622 (2022.01)

(56) References Cited

U.S. PATENT DOCUMENTS

| | | | |
|---|---|---|---|
| 10,142,129 B1* | 11/2018 | Gupta | H04L 45/66 |
| 10,200,278 B2 | 2/2019 | Appanna | |
| 10,355,879 B2 | 7/2019 | Ray et al. | |
| 10,666,500 B2 | 5/2020 | Singh et al. | |
| 11,249,865 B1* | 2/2022 | Agrawal | G06F 11/1464 |
| 2013/0077621 A1* | 3/2013 | Jacob Da Silva | H04L 45/58 |
| | | | 370/355 |
| 2013/0287037 A1* | 10/2013 | Bush | H04L 45/28 |
| | | | 370/401 |
| 2015/0188760 A1* | 7/2015 | Anumala | H04L 45/586 |
| | | | 370/254 |
| 2017/0257309 A1* | 9/2017 | Appanna | H04L 12/4641 |
| 2017/0302519 A1* | 10/2017 | Kumar | H04W 84/18 |
| 2020/0267022 A1* | 8/2020 | Duan | G06F 9/45558 |
| 2020/0274739 A1* | 8/2020 | Liu | H04L 12/4633 |
| 2021/0028957 A1* | 1/2021 | Babbar | H04L 12/4633 |
| 2021/0226910 A1* | 7/2021 | Ranpise | H04L 61/103 |
| 2023/0031683 A1* | 2/2023 | He | H04L 12/4645 |
| 2023/0031685 A1* | 2/2023 | Schäfer | H02M 7/5395 |

OTHER PUBLICATIONS

Sajassi et al., "BGP MPLS-Based Ethernet VPN", Internet Engineering Task Force (IETF), Request for Comments: 7432, Feb. 2015, 156 pages.

* cited by examiner

FIG. 5

FAILURE DETECTION AND MITIGATION IN AN MC-LAG ENVIRONMENT

BACKGROUND

In a general networking topology of communication networks, a network device, such as a switch, may be connected to another switch through a physical link. Different network devices are connected for the purpose of communication and transfer of data. For redundancy and effective bandwidth utilization, more than one physical link between the network devices may be aggregated so as to appear as a single link. This is generally referred to as 'link aggregation'. Link aggregation, by utilizing multiple physical links in parallel, may allow for an increase in the physical link speed beyond the limits of a single physical link and may also allow for an increase in fault tolerance for higher availability of network components.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

Generally, in mufti-chassis link aggregation (MC-LAG) environments, a pair of network devices, such as switches, may be aggregated to form a LAG for resiliency and higher bandwidth. The aggregated pair of network devices uses a dedicated point-point physical link referred to as the 'Inter-Switch Link (ISL)' for exchanging control plane traffic. The ISL helps the pair of network devices to maintain states regarding their multi-chassis link aggregations and also allows passage of data plane traffic between the switch pair from time to time.

In some examples, an overlay network may be implemented on top of the network devices in an MC-LAG environment. An overlay network may be a virtual network deployed on top of a physical network of network devices, such as routers and switches. Nodes in an overlay network may be connected by virtual or logical links or tunnels, each of which may include paths to transport data through multiple physical links in an underlay network. The underlay network includes the physical network infrastructure of network devices for transporting packets from source to destination. Thus, the network devices in the MC-LAG environment may also be configured as a logical Virtual Tunnel Endpoint (VTEP) in the overlay network. The same VTEP Internet Protocol (IP) address may be configured on the network devices in the MC-LAG environment. The reachability of the VTEP is ensured via an underlay routing network which may use underlay routing protocols, such as, Open Shortest Path First (OSPF), static-routing, etc. Since, the network devices in the MC-LAG publish the same VTEP-IP to an underlay-peer, it establishes multiple redundant paths to reach the logical VTEP. Further, the network devices in the MC-LAG environment may also be referred to as a pair of network devices and each network device may be individually referred to as a peer network device.

In some examples, a network device in the MC-LAG environment may perform a reboot, such as while recovering from a device failure or due to update of device software/firmware. Further, the ISL between the pair of network devices in the MC-LAG may be subject to a failure. During reboot of the network device or while recovering from failure of the ISL, a set of operations may be initiated in the network device in parallel. The set of operations may include reprovisioning of virtual tunnels in the network device, publishing of the VTEP IP of the pair of network devices to underlay network devices, and publishing of host routes and prefix routes to an external network connected to the MC-LAG.

Since, while performing the set of operations, the VTEP IP of the pair of network devices is published to the underlay network devices, a remote VTEP, in communication with the network devices in the MC-LAG environment via the overlay network, may learn the underlay routes to the network device which is rebooting. Thus, though reprovisioning of the virtual tunnels at the network device may still be incomplete, the remote VTEP may start forwarding data traffic to the network device. As a consequence, data traffic destined to the VTEP (or hosts behind VTEP) and intended to be carried over virtual tunnels may be dropped for a transient time leading to temporary traffic drops at the network device. These traffic drops may also lead to loss of redundancy in the MC-LAG environment.

The proposed techniques ensure that provisioning of virtual tunnels in the rebooting network device precedes publishing of VTEP IP address in underlay network and publishing of routes to external network, consequently reducing/eliminating traffic loss for the transient time. In an example, the network device may detect a failure event in a network. The failure event may be indicative of a network outage in one of the network device and the peer network device of the MC-LAG environment. In an example, the failure event may be one of rebooting of the network device and snapping of an ISL that provides a communication link between the network device and the peer network device of the MC-LAG environment in the network. Snapping of the ISL may include accidental severing of the ISL and may result in loss of connectivity between the pair of network devices in the MC-LAG environment. The network device and the peer network device may be configured as a first virtual tunnel endpoint (VTEP) in an overlay network. The network device may determine that reprovisioning of a set of virtual tunnels in the network device is incomplete and synchronize state parameters between the network device and the peer network device. The state parameters may be indicative of control plane and forwarding plane states of the network device and the peer network device in the overlay network. After synchronization of state parameters, the set of virtual tunnels in the network device may be provisioned based on the state parameters. In response to the network device determining that provisioning of the set of virtual tunnels is complete, the network device may publish an IP address of the first VTEP to underlay network devices connecting the first VTEP to a second VTEP over an underlay network. Subsequently, the network device may enable communication links between the MC-LAG environment and a host device. According to the above techniques, IP address of the VTEP configured onto the peer network devices in the MC-LAG environment is published to the undelay network devices and external network after provisioning of the set of virtual tunnels is complete. Thus, a remote VTEP and network devices in the external network may initiate sending traffic data to the network device in the MC-LAG once the virtual tunnels in the network devices in the MC-LAG is operational, consequently reducing chances of traffic drops. Thus, with the present techniques, the network device in the MC-LAG environment recovering from the failure event may be efficiently rebooted without resulting in loss of data traffic.

The described systems and methods may be implemented in various switches implementing link aggregation techniques in the communication network. Although, the description herein is with reference to switches implemented in a multi-chassis LAG environment, the methods and described techniques may be implemented in other type of switches implementing different link aggregation techniques, albeit with a few variations. Various implementations of the present subject matter have been described below by referring to several examples.

The above systems and methods are further described with reference to FIG. 1 to FIG. 5. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1:
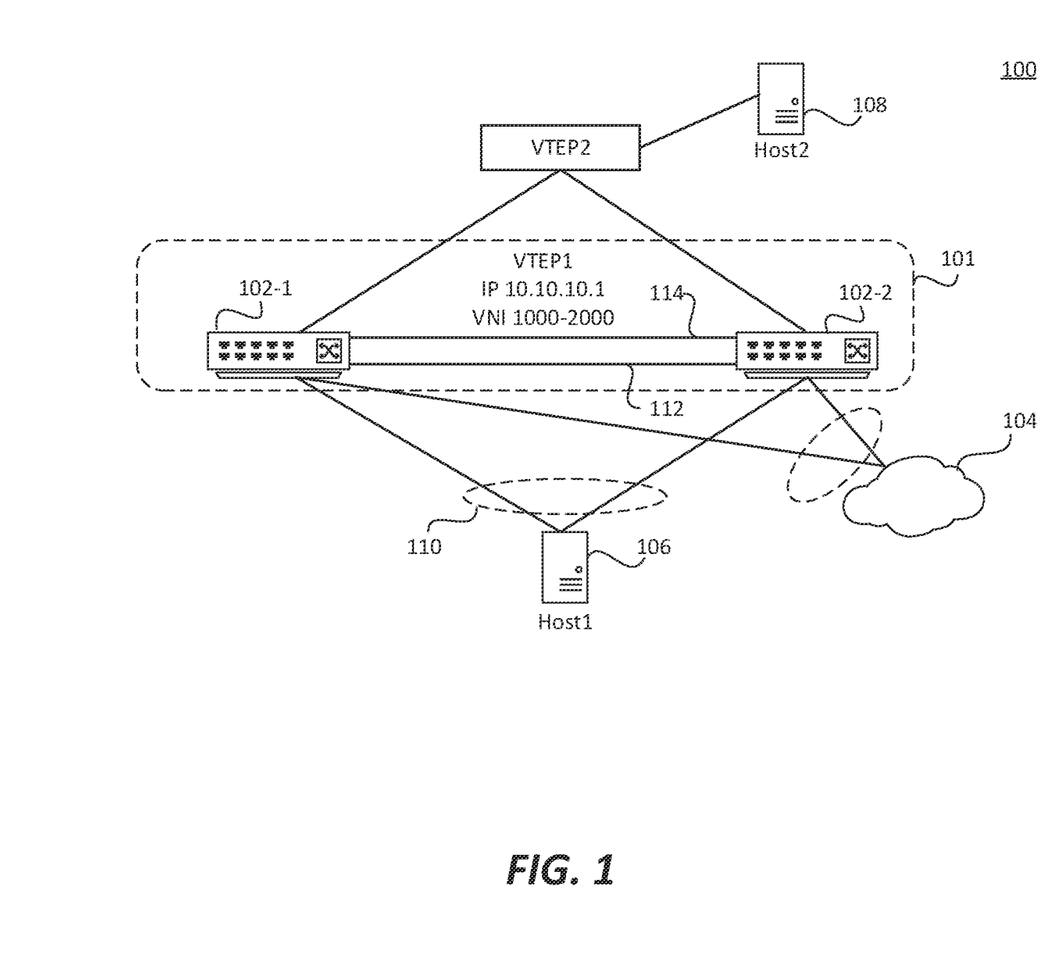
FIG. 1 schematically illustrates a computing network, implementing a MC-LAG environment, according to an example.

FIG. 1 schematically illustrates a computing network 100 implementing a MC-LAG environment 101 according to an example of the present subject matter. The computing network 100 may be a public distributed environment, a private closed computing environment, a combination of the two, etc. According to an implementation of the present subject matter, the computing network 100 may implement a plurality of network devices, such as switch 102-1 and switch 102-2. For ease of explanation, the switch 102-1 and the switch 102-2 have been individually referred to as switch 102, and commonly referred to as pair of switches 102, hereinafter. The MC-LAG environment 101 includes switches 102. Further, although the terms switch and network device may have been used interchangeably in the description, network device may include routers, gateways, and other devices for routing and traffic forwarding. The MC-LAG environment may also include other switches and routers which are not shown here. Each switch 102 may provide connectivity between one or more access switches/hosts and an external network 104. Connectivity to the external network 104 is not shown in detail in FIG. 1, In an example, a routing protocol may be running on uplinks connecting the switches to external network devices (like WAN gateway or Core Router) in the external network 104.

As shown in FIG. 1, host1 106 is aggregated to a pair of switches 102 in the MC-LAG environment 101. Host1 106 may be a computing device that communicates with other hosts, such as host2 108, on the network 100. Hosts on a network may include clients and servers that send or receive data, services or applications. The physical links between the host1 106 and the pair of switches 102 may be aggregated and represented as 110. The switches 102 may be configured as a VTEP in an overlay network, such as a Virtual Extensible Local Area Network (VXLAN) overlay. In an example, the overlay network is established based on Border Gateway Protocol-Ethernet Virtual Private Network (BGP-EVPN) connectivity. In some examples, the host1 106 acts as a BGP-EVPN multi-homed device. In an example, the overlay network may be a VXLAN established using EVPN. BGP is a routing protocol that makes dynamic routing decisions based on paths, network policies, etc., and enables exchange of routing and reachability information among network devices, such as routers, connecting through BGP. In an example, BGP may enable two remote sites connected through a VPN tunnel to exchange routing information. In some examples, EVPN may use a Multiprotocol-BGP mechanism and define a new sub-address family, such as an EVPN address family, in a Layer 2 VPN address family. In the EVPN address family, an EVPN Network Layer Reachability Information (NLRI) may be added. EVPN NLRI may define several types of BGP-EVPN routes, which carry information such as the host IP address, MAC address, and, VXLAN Network Identifier (VNI). After a VTEP learns the IP address and MAC address of a connected host, the VTEP can send the information to other VTEPs through MP-BGP routes. In this way, learning of host IP address and MAC address information can be implemented on the control plane. Thus, control plane states between the pair of switches 102 may be exchanged using BGP. Hence, the switches 102-1 and 102-2 may also be referred to as BGP peers. Since, the switches 102 are configured as a single VTEP, VTEP1, an IP address of the VTEP1 may be assigned to the switches 102. Further, the VTEP1 may be uniquely identified by VXLAN network identifiers (VNIs) associated with the switches 102. As shown in FIG. 1, the VTEP1 has an IP address as 10.10.10.1 and is configured with routes against 1000 VNIs (in the range of 1000-2000).

The VTEP2 may be a tunnel endpoint which may connect to the VTEP1 via virtual tunnels in the overlay network. Thus, VTEP2 may be considered as a remote VTEP with reference to VTEP1 and vice versa. Since, the switches 102 publish the same IP address in the overlay network, the VTEP2 considers switches 102 as a single logical VTEP, i.e., VTEP1 in the overlay network. Hence VTEP2 contains two data paths to reach VTEP1, i.e., one to each peer switch 102.

Further, as shown in FIG. 1, the pair of switches 102 may be connected through a dedicated point-to-point ISL 112, for exchanging control plane traffic and data plane traffic with each other, from time to time. The ISL 112 may therefore allow each switch 102 to maintain states regarding their multi-chassis link aggregations. Further, the pair of switches 102 may also include a 'keep-alive' (KA) physical link 114 to exchange keep-alive messages. The switches 102 may exchange keep-alive messages through the KA physical link 114 to allow each switch to ascertain that the peer switch is live and running. In an example, each switch 102 may exchange state parameters corresponding to its control plane and forwarding plane states through the ISL 110. That is, the state parameters may indicate the state of each switch with respect to their control plane and forwarding plane.

The switch 102 may be implemented as, but not limited to, a distribution layer switching unit, a switch-router, or any device capable of switching data packets at distribution layer and provide connectivity between the external network 104 and the hosts 106 and 108 and between the hosts. Further, although merely the pair of switches 102 and a couple of hosts have been depicted in the MC-LAG environment, it would be understood that the MC-LAG environment 101 may implement several other switches, routers, and hosts.

The external network 104 may be a wireless network, a wired network, or a combination thereof. The external network 104 may be a core network that may provide paths for the exchange of information between different subnetworks. The external network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The external network 104 may also include individual networks, such as, but not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the implementation, the external network 104 may include various network entities, such as base stations, gateways and routers; however, such details have been omitted to maintain the brevity of the description.

In operation, the network device, such as the switch 102-1, may detect a failure event in the network 100. The failure event may be indicative of a network outage in one of the network device, such as the switch 102-1, and a peer network device, such as the switch 102-2, of the MC-LAG environment 101. In an example, the failure event includes rebooting of the network device while recovering from a fatal failure or in response to a firmware/application software upgrade. In another example, the failure event includes operations at the network device while recovering from snapping of the ISL 112 that provides a communication link between the network device, such as the switch 102-1, and the peer network device, such as the switch 102-2, of the MC-LAG environment 101.

Consider that a firmware/application software is updated in the switch 102-1. Alternatively, in another example, the switch 102-1 may identify a failure of the ISL 112 between the peer switches 102. The switch 102-1 may identify failure of the ISL 112 based on determination of outage of control plane traffic and data plane traffic between the peer switches 102 while the keep-alive messages are still being communicated through the KA physical link 114. The first switch 102-1 on identifying the failure of the ISL 112, may compare its state parameters with the state parameters of the second switch 102-2.

In response to detection of the failure event, the switch 102-1 may enable its VXLAN-EVPN interface. In an example, enabling the VXLAN-EVPN interface may include provisioning a loopback IP address in the first VTEP (VTEP1) to enable the VXLAN-EVPN interface in the first VTEP. The loopback IP address may be used to test the VXLAN-EVPN interface and enable VXLAN functionality in the network device. A loopback address refers to an IP address dedicated for testing network cards/functionality of interfaces in a network device. This IP address corresponds to a software loopback interface and does not require a physical connection to a network. The loopback address allows for a reliable method of testing the functionality of the VXLAN-EVPN interface and its drivers and software without a physical network. Provisioning the loopback IP address in the first VTEP may include pinging the VXLAN-EVPN interface to enable the same.

Figure 2:
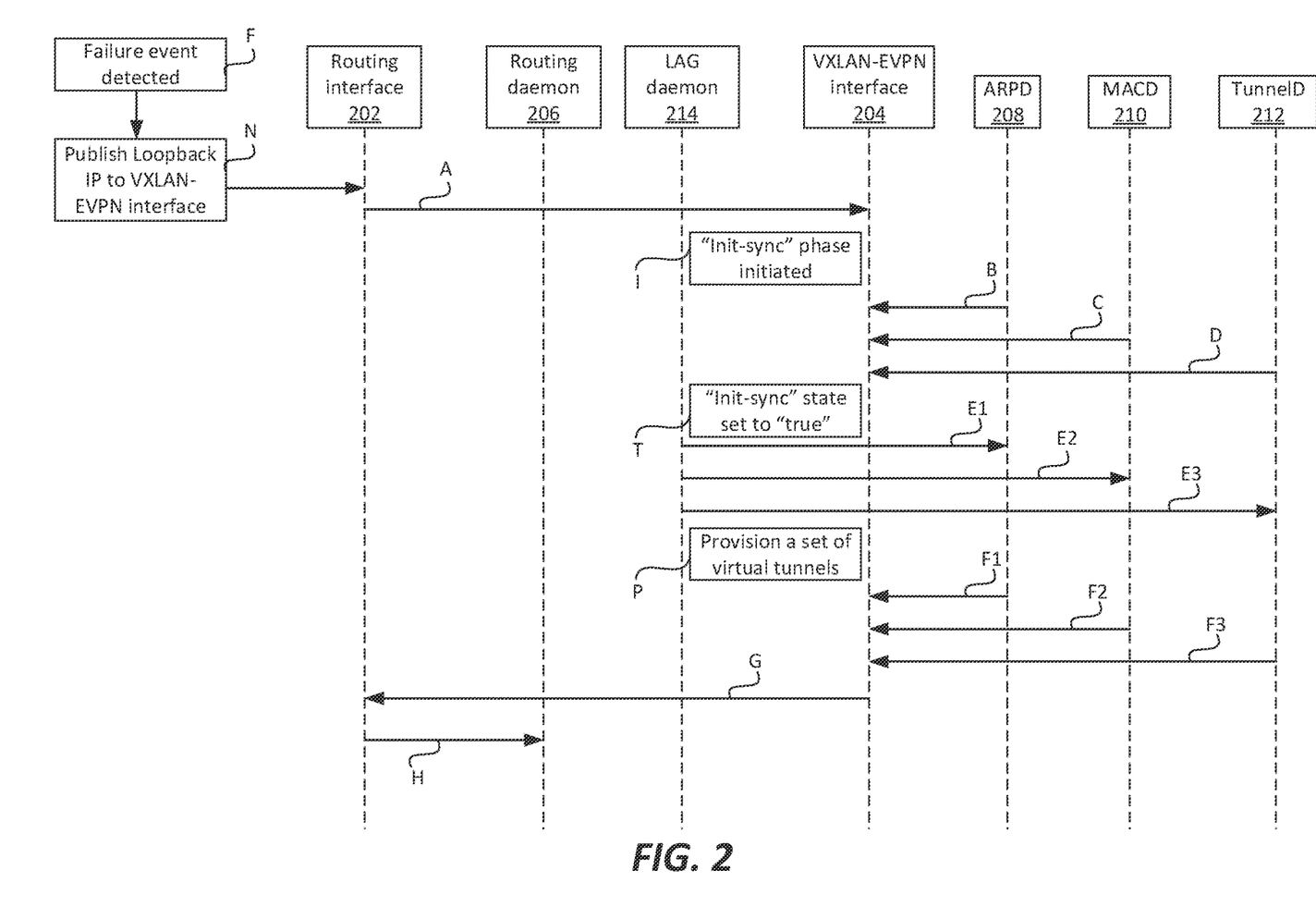
FIG. 2 illustrates a state diagram outlining operations and interactions between various interfaces and daemons in a network device on detection of a failure event, according to an example.

FIG. 2 illustrates an example state diagram outlining operations and interactions between various interfaces and daemons in the network device, such as the switch 102-1, on detection of the failure event F. Interfaces in the network device may include physical and/or logical interfaces for receiving and forwarding messages between different logical and/or physical entities, such as daemons, within the network device, or from external environment. Daemons may include a set of machine-readable instructions running as background processes in the network device. As shown in FIG. 2, in response to detection of the failure event F, a notification N may be received by a routing interface 202. The routing interface 202 may include a physical and/or logical interface which may function as an entry point for all messages/notifications targeted to other interfaces and daemons in the network device. In an example, the routing interface 202 may receive the notification from a port daemon, such as PortD (not shown in FIG. 2). PortD may be understood as a logical entity managing the routing interface and other logical interfaces in the network device. The notification N may indicate that the loopback IP is to be published to a VXLAN-EVPN interface 204. The VXLAN-EVPN interface 204 may include physical and/or logical interfaces which execute operations for implementing VXLAN functionality in the network device. In an example, in response to detection of the failure event, PortD may generate the notification N and send it to the VXLAN-EVPN interface 204. In an example, the loopback IP is the IP address of the VTEP1 i.e. 10.10.10.1, as shown in FIG. 1. In response to receiving the notification N, the routing interface 202 publishes the loopback IP to the VXLAN-EVPN interface 204, as shown by arrow "A" in FIG. 2.

In response to provisioning of the loopback IP in the VXLAN-EVPN interface 204, the VXLAN-EVPN interface 204 may implement a set of background processes for enabling VXLAN functionality in the network device. In an example, the network device may check whether reprovisioning of a set of virtual tunnels in the network device is complete or not. In an example, the virtual tunnels may connect VTEPs in an overlay network, such as VTEP1 and VTEP2, as shown in the FIG. 1. In an example, to check whether reprovisioning of the set of virtual tunnels in the network device is complete or not, it is checked whether entries from Link Aggregation Control Protocol (LACP), MAC, and Address Resolution Protocol (ARP) databases are configured in the network device. In response to determining that entries from LACP, MAC, and ARP databases are not configured in the network device, the network device determines that reprovisioning of the set of virtual tunnels in the network device is incomplete.

In response to determining that reprovisioning of the set of virtual tunnels is incomplete, the VXLAN-EVPN interface 204 may initiate an "init-sync" phase for the network device, as shown at block I. In the "init-sync" phase, the network device synchronizes state parameters between the network device and the peer network device in the MC-LAG environment. With reference to FIG. 1, the switch 102-1 may synchronize state parameters with the switch 102-2. The state parameters are indicative of control plane and forwarding plane states of the network device and the peer network device in the overlay network. In an example, the state parameters synchronized between the pair of switches 102 may include Dynamic Media Access Control (MAC) addresses, MAC-IP mappings, layer 2 and layer 3 VXLAN Network Identifiers (VNIs) associated with the remote peer, and IP address of the remote peer. The remote peer may be a peer network device in the MC-LAG. In an example, synchronization of the state parameters may include the rebooted network device downloading LACP, MAC, and ARP database entries from the peer network device using ARP daemon (ARPD) 208 and MAC daemon (MACD) 210, as shown by arrows B and C in FIG. 2. Thus, the state parameters may include information identifying neighbor devices for the rebooting network device. Further, in another example, synchronization of the state parameters may include downloading tunnel credentials (such as VNIs) associated with the peer network device, such as the switch 102-2 in FIG. 1, using Tunnel Daemon (TunnelD) 212, as shown by arrow D in FIG. 2. ARPD 208, MACD 210, and TunnelD 212 are examples of logical interfaces managing MAC-IP mappings, dynamic MAC learnings, and tunnel credentials, respectively, for the neighbor devices. In an example, the synchronization of the state parameters from the peer network device occurs through the ISL 110, based on ISL protocol.

In response to synchronizing the state parameters, the network device checks whether BGP sessions are established with the neighbor devices based on the state parameters (including neighbor information) downloaded from the peer network device. Once the BGP sessions are established with each of the neighbour devices, the network device may obtain route information from each of the neighbor devices. In an example, the route information may include information stored in router information base (RIB) tables in each of the neighbor devices. In an example, synchronization of the route information is based on establishment of Border Gateway Protocol (BGP) sessions between the first VTEP and the second VTEP of FIG. 1. The route information may include MAC routes, neighbor information, host routes, and prefix routes.

In response to synchronization of state parameters and the route information, an "init-sync" state of the network device may be set to be "true", which is indicative of completion of synchronization of the state parameters and route information, as shown at block T. In an example, information regarding the "init-sync" state may be maintained in a database associated with a LAG daemon 214. The LAG daemon 214 includes instructions for implementing the MC-LAG 101 and maintains databases (tables) storing states of the MC-LAG 101. The LAG daemon 208 may publish the information regarding the "init-sync" state to ARPD 208, MACD 210, and TunnelD 212, as shown by arrows E1, E2, and E3 in FIG. 2, thereby indicating that EVPN-VXLAN-EVPN functionality is enabled in the network device.

In response to completion of synchronization of the state parameters and route information, the set of virtual tunnels may be provisioned in the network device based on the state parameters, as shown at block P. In an example, provisioning the set of virtual tunnels may include configuring the network device using at least a portion of the state parameters and route information to forward overlay network traffic through the set of virtual tunnels. In an example, each of ARPD 208, MACD 210, and TunnelD 212 may configure the network device using the state parameters and route information for forwarding network traffic of the overlay network through the virtual tunnels.

In an example, once the configuration of the network device is complete, the same may be indicated to the VXLAN-EVPN interface 204 by notifications from ARPD 208, MACD 210, and TunnelD 212, as shown by arrows F1, F2, F3, respectively, in FIG. 2. Based on the notifications from ARPD 208, MACD 210, and TunnelD 212, the network device may determine that provisioning of the set of virtual tunnels is complete. In response to completion of provisioning of the set of virtual tunnels, in an example, the VXLAN-EVPN interface 204 sends a request to the routing interface 202 to provision the Loopback IP address (i.e. the IP of the VTEP 1) in the routing daemon 206, as shown by arrow G in FIG. 2. In response to receiving the request, the routing interface 202 publishes the loopback VTEP IP to the routing daemon 206, as shown by arrow H in FIG. 2.

Subsequently, the routing daemon 206 may publish the loopback VTEP IP (i.e., the IP address of VTEP1) to the underlay network devices. Thus, after completion of provisioning of the set of virtual tunnels in the network device, the routing daemon 206 publishes the loopback VTEP IP of the first VTEP to underlay network devices connecting the first VTEP to the second VTEP over the underlay network. Thus, the IP address of the first VTEP is shared with underlay routing protocols after completion of provisioning of the set of virtual tunnels.

In response to publishing the IP address of the first VTEP to the underlay network devices, the network device 102-1 may enable communication links between the MC-LAG environment and a host device, such as host1 106 of FIG. 1. Further, uplinks from the network device 102-1 and the peer network device 102-2 of the MC-LAG environment to an external network 106 may also be enabled, responsive to publishing the IP address of the first VTEP to the underlay network devices.

Figure 3:
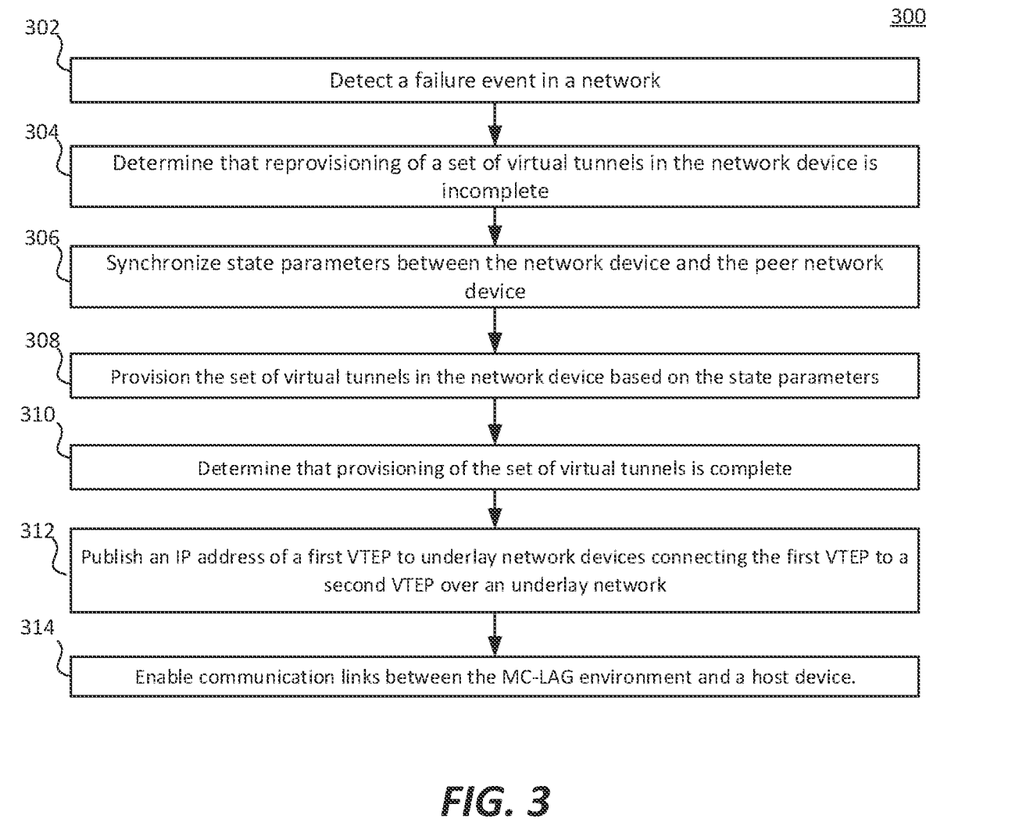
FIG. 3 is a flowchart illustrating a method for handling a failure event in a network device, according to an example.

FIG. 3 is a flowchart illustrating a method 300 for handling a failure event in a network device, according to an example. Method 300 may be executed on a network device, such as the switch 102-1 in an MC-LAG environment 101 of FIG. 1.

At block 302, a network device in an MC-LAG environment may detect a failure event in a network, such as the network 100 of FIG. 1. The failure event may include one of rebooting of the network device and snapping of an ISL, such as the ISL 100, that provides a communication link between the network device and a peer network device of an MC-LAG environment in the network. In an example, the network device may be rebooted while recovering from a fatal error or after a firmware upgrade. In another example, the network device may undergo a series of operations similar to those occurring during a reboot when the ISL fails.

At block 304, the network device determines that reprovisioning of a set of virtual tunnels is incomplete. Reprovisioning of the set of virtual tunnels may be checked based on whether entries from LACP, MAC, and ARP databases are configured in the network device. At block 306, the network device synchronizes its state parameters with the peer network device in the MC-LAG environment. The state parameters are indicative of control plane and forwarding plane states of the network device and the peer network device in an overlay network, such as a VXLAN overlay network.

At block 308, the network device may provision the set of virtual tunnels based on the state parameters. Provisioning the set of virtual tunnels may include configuring the network device using at least a portion of the state parameters. The network device may track provisioning of the set of virtual tunnels. Based on the tracking, at block 310, the network device may determine that provisioning of the set of virtual tunnels is complete. At block 312, after completion of provisioning of the set of virtual tunnels, the network device may publish an IP address of the first VTEP; such as VTEP1 of FIG. 1 to underlay network devices connecting the first VTEP to a second VTEP, such as VTEP2, over an underlay network. At block 314, the network device may enable communication links between the MC-LAG environment and a host device, such as host1 106.

Figure 4A:
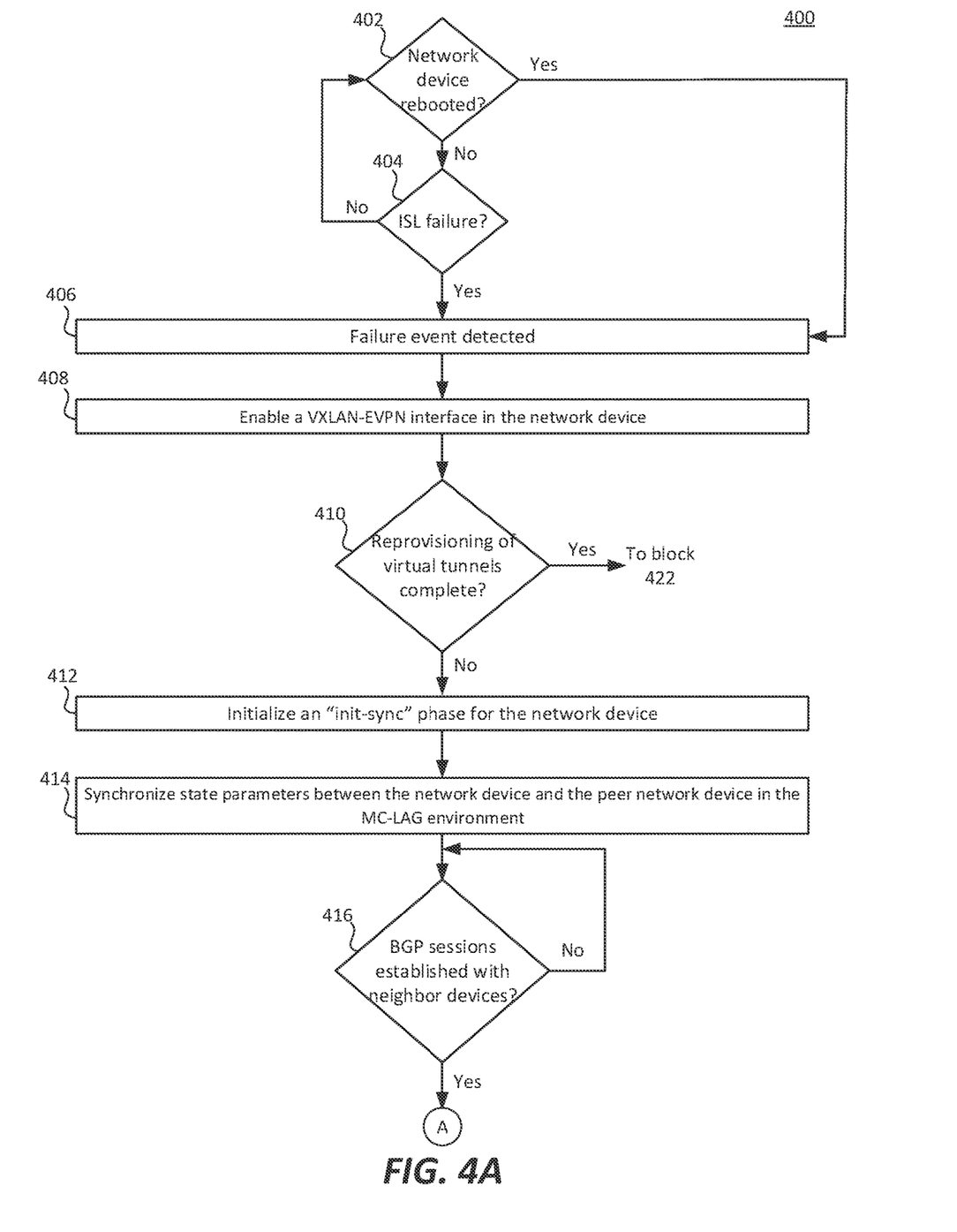
FIGS. 4A and 4B is a flowchart illustrating a method for handling a failure event in a network device, according to an example.
Figure 4B:
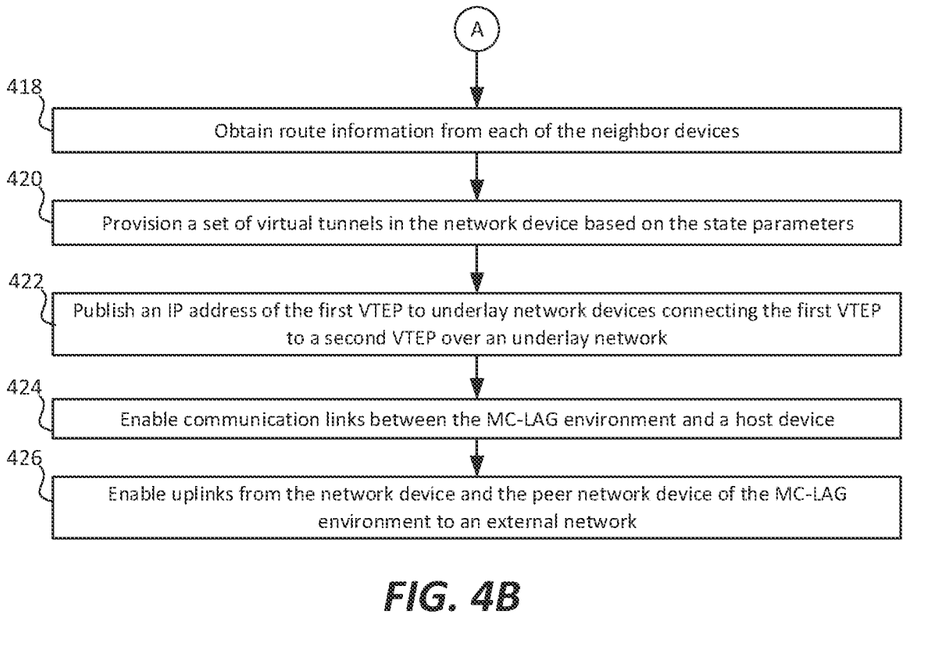

FIGS. 4A and 4B illustrate a flowchart depicting a method 400 for handling a failure event in a network, according to an example. Method 400 may be executed on a network device, such as the switch 102-1 of FIG. 1.

At block 402, the network device checks whether it is rebooted. In an example, the network device may be rebooted due to an error or due to installation of a firmware/software, etc. On determining that the network device is rebooted ('Yes' branch from block 402), the network device may detect a failure event, at block 406. On determining that the network device is not rebooted ('No' branch from block 402), is the network device may check whether there is a failure in the ISL between the network device and a peer network device in a MC-LAG environment, at block 404. If a failure is identified in the ISL ('Yes' branch from block 404), the network device detects occurrence of a failure event, at block 406.

In response to detection of the failure event, at block 408, the network device may enable a EVPN-VXLAN interface (such as 204). In an example, enabling the EVPN-VXLAN interface may include provisioning a loopback IP address in the first VTEP (VTEP1) to enable the EVPN-VXLAN interface in the first VTEP. Once the loopback IP is provisioned in the EVPN-VXLAN interface, the EVPN-VXLAN interface may implement a set of background processes for enabling VXLAN functionality in the network device. In an example, the network device may check whether reprovisioning of a set of virtual tunnels in the network device is complete or not, at block 410. In an example, to check whether reprovisioning of the set of virtual tunnels in the network device is complete or not, it is checked whether entries from Link LACP, MAC, and ARP databases are configured in the network device. In response to determining that entries from LACP, MAC, and ARP databases are not configured in the network device, it is determined that reprovisioning of the set of virtual tunnels in the network device is incomplete. In response to determining that reprovisioning of the set of virtual tunnels in the network device is incomplete ('No' branch from block 410), the network device initiates an "init-sync" phase, at block 412. In the "init-sync" phase, the network device may synchronize state parameters between the network device and the peer network device in the MC-LAG environment, at block 414. With reference to FIG. 1, the switch 102-1 may synchronize state parameters with the switch 102-2. The state parameters are indicative of control plane and forwarding plane states of the network device and the peer network device in the overlay network. In an example, the state parameters synchronized between the pair of switches 102 may include Dynamic Media Access Control (MAC) addresses, MAC-IP mappings, layer 2 and layer 3 VXLAN Network Identifiers (VNIs) associated with the remote peer, and IP address of the remote peer. In an example, synchronization of the state parameters may include the rebooted network device downloading LACP, MAC, and ARP database entries from the peer network device. The state parameters may include information identifying neighbor devices for the rebooting network device. Further, in another example, synchronization of the state parameters may include downloading tunnel credentials (such as VNIs) associated with the peer network device.

In response to synchronizing the state parameters, the network device may check whether BGP sessions are established with the neighbor devices based on the state parameters (including neighbor information) downloaded from the peer network device. Once the BGP sessions are established with each of the neighbour devices ('Yes' branch from block 416), the network device may obtain route information from each of the neighbor devices, at block 418. In an example, the route information may include information stored in router information base (RIB) tables in each of the neighbor devices. In an example, synchronization of the route information is based on establishment of BGP sessions between the first VTEP and the second VTEP of FIG. 1. The route information may include MAC routes, neighbor information, host routes, and prefix routes. Obtaining the route information from the neighbor devices may also be referred to as synchronization of route information.

In response to completion of synchronization of the state parameters and route information, the set of virtual tunnels may be provisioned in the network device based on the state parameters, at block 420. In an example, provisioning the set of virtual tunnels may include configuring the network device using at least a portion of the state parameters and route information to forward traffic of the overlay network through the virtual tunnels.

After completion of provisioning of the set of virtual tunnels, the network device may publish the IP address of the first VTEP (VTEP1) to underlay network devices connecting the first VTEP to a second VTEP (VTEP2) over an underlay network, at block 422. In response to publishing the loopback IP to the underlay network devices, the network device may enable communication links between the MC-LAG environment and a host device, such as host1 106 of FIG. 1, at block 424. Further, the network device may enable uplinks from the network device and the peer network device of the MC-LAG environment to an external network at block 426, responsive to publishing the IP address of the first VTEP to the underlay network devices.

Figure 5:
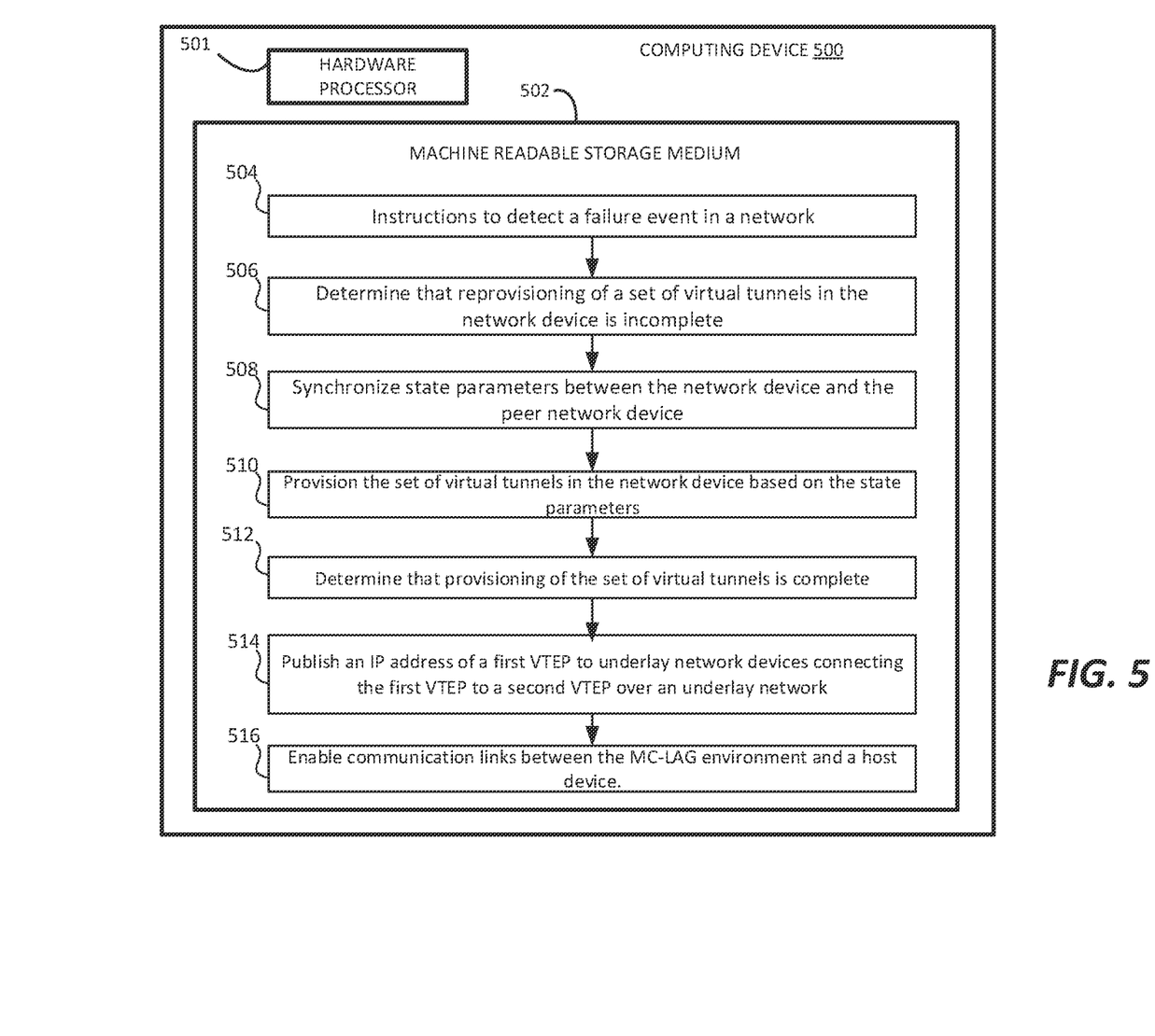
FIG. 5 illustrates a computing device for implementing the method for handling a failure event, according an example.

FIG. 5 is an example computing device 500, with a hardware processor 501, and accessible machine-readable instructions stored on a machine-readable medium 502 for implementing one example system, according to one or more disclosed example implementations. In an example, the computing device 500 may be a network device, such as the switch 102 described above in reference to FIG. 1. FIG. 5 illustrates computing device 500 configured to perform instructions 504, 506, 508, 510, 512, 514 and 516 described below. However, computing device 500 may also be configured to perform the flow of other methods, techniques, functions, or processes described in this disclosure, such as, for example the method 300 of FIG. 3.

A processing element such as processor 501 may contain one or more hardware processors, where each hardware processor may have a single or multiple processor cores. In one embodiment, the processor 501 may include at least one shared cache that stores data (e.g., computing instructions) that are utilized by one or more other components of processor 501. For example, the shared cache may be a locally cached data stored in a memory for faster access by components of the processing elements that make up processor 501. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 5, the processing elements that make up processor 501 may also include one or more of other types of hardware processing components, such as graphics processing units (GPU), application specific integrated circuits (ASICs), field-programmable gate arrays (FPGAs), and/or digital signal processors (DSPs).

The processor 501 may be operatively and communicatively coupled to a memory. The memory may be a non-transitory computer readable medium, such as the machine readable storage medium 502, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The machine readable medium 502 includes instructions 504 that; when executed by the processor 501, cause a network device to detect a failure event in a network. The failure event is indicative of a network outage in one of a network device and a peer network device of an MC-LAG environment, where the network device and the peer network device is configured as a first virtual tunnel endpoint (VTEP) in an overlay network. The instructions 506 that, when executed by the processor, cause the network device to determine that reprovisioning of a set of virtual tunnels in the network device is incomplete. Further, instructions 508 when executed by the processor 501, cause the network device to synchronize state parameters between the network device and the peer network device, where the state parameters are indicative of control plane and forwarding plane states of the network device and the peer network device in the overlay network. The instructions 510 when executed by the processor 501, cause the network device to provision the set of virtual tunnels in the network device based on the state parameters. The instructions 512 when executed by the processor 501, cause the network device to determine that provisioning of the set of virtual tunnels is complete. After completion of provisioning of the set of virtual tunnels, the instructions 514 when executed by the processor 501, cause the network device to publish, an Internet Protocol (IP) address of the first VTEP to underlay network devices connecting the first VTEP to a second VTEP over an underlay network. Further, the instructions 516 when executed by the processor 501, cause the network device to enable communication links between the MC-LAG environment and a host device.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to.". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

We claim:

1. A network device participating in a multi-chassis link aggregation (MC-LAG), comprising:
    a processor; and
    a non-transitory, computer-readable medium including instructions that, when executed by the processor, cause the network device to:
        detect a failure event indicative of a network outage in the MC-LAG, wherein the MC-LAG includes the network device and a peer network device that are configured as a first virtual tunnel endpoint (VTEP) in an overlay network;
        determine that reprovisioning of a set of virtual tunnels of the overlay network is incomplete due to the network outage in the network device;
        in response to the reprovisioning being incomplete, synchronize state parameters with the peer network device, wherein the state parameters are indicative of control plane and forwarding plane states of the network device and the peer network device in the overlay network;
        in response to the state parameters being synchronized, provision the set of virtual tunnels in the network device based on the synchronized state parameters;
        determine that provisioning of the set of virtual tunnels is complete;
        publish, in response to completion of provisioning of the set of virtual tunnels, an Internet Protocol (IP) address of the first VTEP to underlay network devices via which paths associated with the set of virtual tunnels are established; and
        enable communication links of the MC-LAG coupling a host device.

2. The network device of claim 1, further comprising instructions that, when executed by the processor, cause the network device to enable uplinks from the network device to an external network in response to publishing the IP address of the first VTEP to the underlay network devices.

3. The network device of claim 1, wherein the failure event is one of: rebooting of the network device and snapping of an inter-switch link (ISL), wherein the ISL provides a communication link between the network device and the peer network device for the MC-LAG.

4. The network device of claim 1, further comprising instructions that, when executed by the processor, cause the network device to, in response to detecting the failure event, provision a loopback Internet Protocol (IP) address in the first VTEP to enable a tunnel interface in the first VTEP.

5. The network device of claim 1, further comprising instructions that, when executed by the processor, cause the network device to in response to synchronizing the state parameters, synchronize route information between the first VTEP and a second VTEP, wherein the second VTEP is coupled to the first VTEP via a tunnel.

6. The network device of claim 5, wherein synchronization of the route information is based on establishment of Border Gateway Protocol (BGP) sessions between the first VTEP and the second VTEP.

7. The network device of claim 5, wherein the route information includes media access control (MAC) routes, neighbor information, host routes, and prefix routes.

8. The network device of claim 1, wherein the state parameters include Dynamic MAC addresses, MAC-IP mappings, layer-2 and layer-3 VXLAN Network Identifiers (VNIs) associated with the remote peer, and IP address of the remote peer.

9. The network device of claim 1, wherein the overlay network includes an Ethernet virtual private network (EVPN).

10. A method comprising:
   detecting a failure event indicative of a network outage in a multi-chassis link aggregation (MC-LAG), wherein the MC-LAG includes the network device and a peer network device that are configured as a first virtual tunnel endpoint (VTEP) in an overlay network;
   determining that reprovisioning of a set of virtual tunnels of the overlay network is incomplete due to the network outage in the network device;
   in response to the reprovisioning being incomplete, synchronizing state parameters with the peer network device, wherein the state parameters are indicative of control plane and forwarding plane states of the network device and the peer network device in the overlay network;
   in response to the state parameters being synchronized, provisioning the set of virtual tunnels in the network device based on the synchronized state parameters;
   determining that provisioning of the set of virtual tunnels is complete;
   publishing, in response to completion of provisioning of the set of virtual tunnels, an Internet Protocol (IP) address of the first VTEP to underlay network devices via which paths associated with the set of virtual tunnels are established; and
   enabling communication links of the MC-LAG coupling a host device.

11. The method of claim 10, further comprising:
   enabling uplinks from the network device to an external network in response to publishing the IP address of the first VTEP to the underlay network devices.

12. The method of claim 10, wherein the failure event is one of: rebooting of the network device and snapping of an inter-switch link (ISL), wherein the ISL provides a communication link between the network device and the peer network device for the MC-LAG.

13. The method of claim 10, further comprising provisioning a loopback Internet Protocol (IP) address in the first VTEP to enable a tunnel interface in the first VTEP.

14. The method of claim 10, further comprising, in response to synchronizing the state parameters, synchronizing route information between the first VTEP and a second VTEP, wherein the second VTEP is coupled to the first VTEP via a tunnel.

15. The method of claim 14, wherein synchronization of the route information is based on establishment of Border Gateway Protocol (BGP) sessions between the first VTEP and the second VTEP.

16. A non-transitory, computer-readable medium including instructions that, when executed by processing circuitry, cause a network device to:
   detect a failure event indicative of a network outage in a multi-chassis link aggregation (MC-LAG), wherein the MC-LAG includes the network device and a peer network device that are configured as a first virtual tunnel endpoint (VTEP) in an overlay network;
   determine that reprovisioning of a set of virtual tunnels of the overlay network is incomplete due to the network outage in the network device;
   in response to the reprovisioning being incomplete, synchronize state parameters with the peer network device, wherein the state parameters are indicative of control plane and forwarding plane states of the network device and the peer network device in the overlay network;
   in response to the state parameters being synchronized, provision the set of virtual tunnels in the network device based on the synchronized state parameters;
   determine that provisioning of the set of virtual tunnels is complete;
   publish, in response to completion of provisioning of the set of virtual tunnels, an Internet Protocol (IP) address of the first VTEP to underlay network devices via which paths associated with the set of virtual tunnels are established; and
   enable communication links of the MC-LAG coupling a host device.

17. The non-transitory computer-readable medium of claim 16, further comprising instructions that, when executed by processing circuitry, cause the network device to:
   enable uplinks from the network device to an external network in response to publishing the IP address of the first VTEP to the underlay network devices.

18. The non-transitory computer-readable medium of claim 16, wherein the failure event is one of: rebooting of the network device and snapping of an inter-switch link (ISL), wherein the ISL provides a communication link between the network device and the peer network device for the MC-LAG.

19. The non-transitory computer-readable medium of claim 16, further comprising instructions that, when executed by processing circuitry, cause the network device to, in response to detecting the failure event, provision a loopback Internet Protocol (IP) address in the first VTEP to enable a tunnel interface in the first VTEP.

20. The non-transitory computer-readable medium of claim 16, further comprising instructions that, when executed by processing circuitry, cause the network device to, in response to synchronizing the state parameters, synchronize route information between the first VTEP and a second VTEP, wherein the second VTEP is coupled to the first VTEP via a tunnel.

* * * * *